W. SIECK, Jr., AND S. DRUCKER.
APPARATUS FOR TREATING LIQUIDS WITH GASES.
APPLICATION FILED JUNE 16, 1919.

1,335,398. Patented Mar. 30, 1920.

Inventors
William Sieck Jr. and
Samuel Drucker
BY
Attorney

UNITED STATES PATENT OFFICE.

WILLIAM SIECK, JR., AND SAMUEL DRUCKER, OF CHICAGO, ILLINOIS.

APPARATUS FOR TREATING LIQUIDS WITH GASES.

1,335,398.

Specification of Letters Patent.

Patented Mar. 30, 1920.

Application filed June 16, 1919. Serial No. 304,613.

*To all whom it may concern:*

Be it known that we, WILLIAM SIECK, Jr., and SAMUEL DRUCKER, citizens of the United States, residing at Chicago, in the county of Cook and State of Illinois, have invented certain new and useful Improvements in Apparatus for Treating Liquids with Gases, of which the following is a specification.

This invention relates to improvements in apparatus for the purpose of treating liquids with gases and is particularly adapted, though not necessarily limited in its use, for the purpose of treating a mixture of oil and a catalyst with hydrogen gas or hydrogen containing gases. In the present exemplification of this invention the description will be confined to an apparatus for the hydrogenation of oils.

Heretofore the apparatus commonly used in this art consists of a cylindrical tank having therein an agitator and a perforated coil or gas distributing device arranged at the bottom of the tank for admitting the gas into the tank. Considerable objection and difficulty has been experienced with an apparatus of this kind in that during the operation thereof it has been discovered that the oil therein has no uniform or defined motion in any fixed direction, but moves in all directions due to the forming of eddies caused by obstructions on the inside of the tank, such for instance as coils, braces, etc. By reason of these conflicting currents of oil it has heretofore been impossible to control the flow of gases through the oil, with the result that a considerable amount of the gas rises through the oil without having had the proper time to re-act with it or perform its function. This is decidedly objectionable for many reasons and particularly by reason of the fact that it necessitates a prolonged period of treatment of the oil.

In the hydrogenation of certain oils, such for example as soy bean oil for edible purposes, it is highly desirable that the period of re-action be as brief as possible. It has been found that a certain amount of the oil is hydrolyzed due to the high temperature and a certain amount of water vapor which is always present, also that certain catalyzer poisons in the oil re-act with the catalyzer, all of which is detrimental to the efficient working of the process and can be prevented to a great extent by shortening the time of treatment.

To overcome these objections and difficulties and to provide a means whereby the flow of gas through the oil may be controlled, in order that the gas may re-act upon the oil with the greatest efficiency, and thereby lead to a shortening of the time of the treatment of the oil, is one of the objects of the present invention.

It has been discovered that the speed of the flow of gases through liquids in the form of gas bubbles, is a function of the density of the liquid, the density of the gas and the depth of the liquid. In the case of a bubble of hydrogen arising through a body of heated oil contained in the common form of apparatus now in use, the velocity imparted, due to the great differences in the density of the oil and the gas, may be as high as 30 feet per second, so that a bubble of gas may have passed through the entire body of oil contained in the apparatus in a fraction of one second.

It is believed that the catalytic hydrogenation of oils carries with it a series of side re-actions between the hydrogen and the catalyst, and the catalyst and the oil; and that this cycle requires an appreciable amount of time for its completion.

To provide a means for holding the gas in contact with the catalyst and oil for a period long enough to complete the re-action and to prevent a too rapid rise of the hydrogen through the oil, is another object of the present invention.

In the drawing

Figure 1:
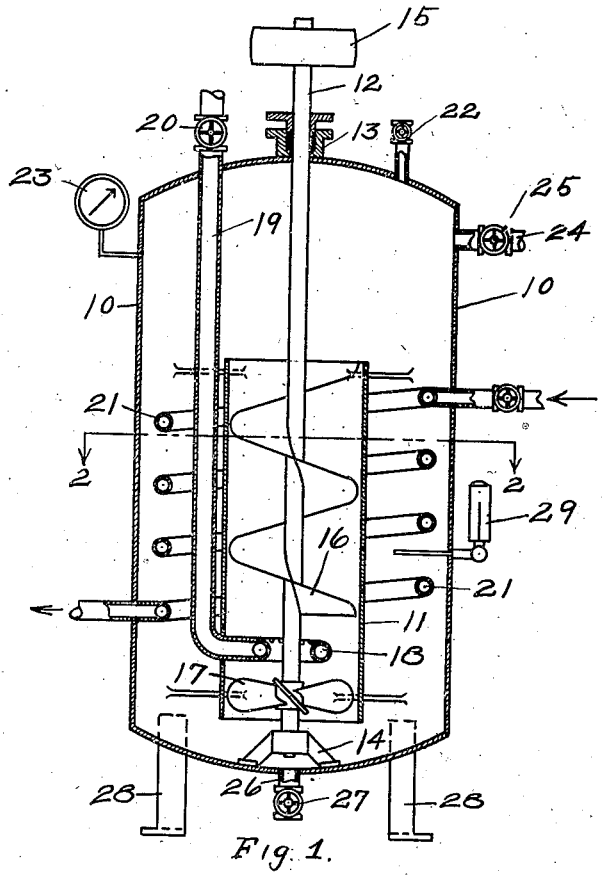
Figure 1 is a vertical, longitudinal, sectional view of an improved apparatus of this character constructed in accordance with the principles of this invention.
Figure 2:
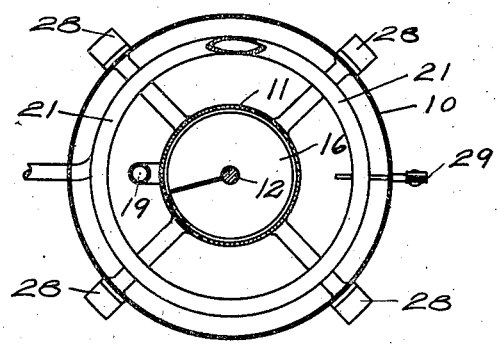
Fig. 2 is a horizontal sectional view taken on line 2—2, Fig. 1.

Referring more particularly to the drawing the apparatus consists primarily of a closed tank 10 of any desired size and configuration and constructed of any suitable material which is capable of withstanding considerable internal pressure.

Arranged within the tank is an upright tubular or cylindrical member 11 having its top and bottom open. This element 11 forms a chamber preferably centrally disposed within the tank and is of a length considerably less than the height of the tank, so that communication will be established between the chamber and the tank to permit the ready flow of liquid from one to the other.

A shaft 12 extends into the tank, and through the chamber. This shaft passes through a suitable stuffing box 13 and the lower end of the shaft is journaled in a suitable bearing 14, the shaft being given a rotary motion in any suitable manner such as by means of a driving pulley 15 located at the upper end of the shaft.

Arranged within the central chamber and connected with the shaft is a helicoid or spiral propeller 16 which is wound about the shaft and with its extremities terminating within the tubular element 11, and if desired at a lower point of the shaft and preferably spaced from the helicoid 16 is a propeller or agitator 17, the diameter of which is not greater than the diameter of the tubular element 11. This propeller or agitator is preferably of the same pitch and rotation as the helicoid 16 and is connected to the shaft 12 to rotate therewith and with the helicoid.

A gas distributing device of any suitable type is preferably arranged between the agitator 17 and the adjacent end of the helicoid and is of a size to deliver and discharge streams of gas bubbles into the chamber at the bottom thereof, so that the gas bubbles will be projected upwardly into the tubular member 11. The tubular member 11 will therefore confine gas to a certain portion of the oil within the tank 10, that is, to the portion of the oil within the chamber formed by the tubular member, so that gas will not be discharged through the entire cross section of the oil in the tank as has heretofore been the practice. This gas discharge device 18 is suitably supported and receives its supply from a suitable source through a suitable pipe 19 in which may be arranged a suitable controlling valve 20.

The helicoid 16 and the propeller blades 17 are so arranged that when the shaft 12 is rotated the oil within the chamber or tubular member 11 will be forced to flow in a downward direction, while the gas being discharged into the chamber or tubular member will have an upward or counter-direction of flow.

Arranged within the tank 10 is a coil 21 provided with a suitable inlet and outlet for the admission of a heating medium such as steam, and by means of which the temperature of the oil within the tank may be regulated.

A pressure releasing valve 22, a pressure gage 23 and a fill pipe 24 may also be provided for the tank, and the fill pipe 24 may be provided with a controlling valve 25, while the tank 10 may be provided with a draw-off or clean out discharge 26 having a controlling valve 27, the tank 10 being preferably supported by means of suitable supports or legs 28.

A thermometer 29 which also has communication with the interior of the tank may be provided if desired, for ascertaining the temperature of the contents of the tank.

In operation, the tank may be filled to a predetermined level, which level is preferably at a point somewhat above the upper open end of the tubular member 11, with a mixture of oil and catalyst. The shaft 12 is then set in motion in such a direction of rotation that the helicoid or spiral 16 will impart to the oil or liquid within the tubular member 11 a downward flow, or in a direction opposed to the direction of flow of the gas into the liquid within the tubular member 11.

The speed of rotation of the shaft 12 and the helicoid is preferably such that the downward velocity of the oil within the tubular member 11, is slightly less than the upward velocity of the gas issuing from the discharge 18, with the result that there is a relatively slow upward movement of the gas through the tubular element 11. This allows the gas sufficient time to re-act completely with the oil and catalyst. The circulation of the oil within the tubular element set up by the helicoid will cause the oil to flow from the tubular element through the bottom thereof and into the tank around the outside of the element and this will result in a complete commingling of the gas with the oil.

The control of the flow of gas through the oil is accomplished through the medium of the helicoid or spiral 16, that is, by reason of the speed of rotation thereof. If the helicoid or spiral is rotated slowly, it will be manifest that a corresponding rate of flow will be imparted to the oil, but if the speed of rotation of the helicoid or spiral is rapid, the flow of the oil will also be rapid and as the oil flows counterwise to the gas bubbles, it will follow that if the rate of flow of the oil is rapid, it will overcome or retard the velocity or flow of the gas and permit the gas to flow upwardly at a much slower rate of speed. The propeller or agitator 17 also serves as a means for preventing the heavier particles from settling or accumulating at the bottom of the tank.

What is claimed as new is:—

1. An apparatus for treating liquids with gases and embodying a tank for the liquid, means for producing a downward flow of a portion only of the liquid within the tank, means for confining the said flow of the liquid within a predetermined zone within the tank, and means for introducing a gas into the liquid within the said zone, the said liquid and gas flowing in opposite directions.

2. An apparatus for treating liquids with gases and embodying a tank for the liquid, means for producing a downward flow of a portion only of the liquid within the tank, means for confining the said flow of the liquid within a predetermined zone within the tank, and means for introducing a stream of gas bubbles into the said zone and in a direction opposed to the direction of flow of the liquid in said zone.

3. An apparatus for treating liquids with gases and embodying a tank for the liquid, means for introducing a gas into the liquid and means for producing a counter flow of the central portion of the liquid contained in the tank, the said means embodying means for confining the said counter flow of liquid to the central portion of the apparatus.

4. An apparatus for treating liquids with gases and embodying a tank for the liquid, means for introducing a stream of gas bubbles into the liquid at the bottom of the tank, means for confining said stream of bubbles within a predetermined zone within the tank, and means for retarding the flow of gas through the liquid in the said zone.

5. An apparatus for treating liquids with gases embodying a tank for the liquid, means for producing a downward flow of the liquid in the tank and within a predetermined zone only, the said means embodying means for confining the said flow to the said zone, and means for producing in the said zone of liquid a stream of ascending gas bubbles, the said stream of gas bubbles being confined within said zone.

6. An apparatus for treating liquids with gases embodying a tank for the liquid, means for producing a downward flow of the liquid in the tank and within a predetermined zone only, the said means embodying means for confining the said flow to the said zone, and means for producing in the said zone of liquid a stream of ascending gas bubbles, the said stream of gas bubbles being confined within said zone, the first recited means embodying a revolving spiral or helicoid.

7. An apparatus for treating liquids with gases embodying a tank for the liquid, means for producing a downward flow of the liquid in the tank and within a predetermined zone only, the said means embodying means for confining the said flow to the said zone, and means for producing in the said zone of liquid a stream of ascending gas bubbles, the said stream of gas bubbles being confined within said zone, the first recited means embodying means whereby the velocity of the gas bubbles through the liquid may be controlled at will.

8. An apparatus for treating liquids with gases embodying a tank for the liquid, means for producing a downward flow of the liquid in the tank and within a predetermined zone only, the said means embodying means for confining the said flow to the said zone, and means for producing in the said zone of liquid a stream of ascending gas bubbles, the said stream of gas bubbles being confined within said zone, the first recited means also embodying means whereby the velocity of the gas bubbles through the liquid may be controlled by the velocity of the downward flow of the liquid.

9. An apparatus for treating liquids with gases and embodying a tank for the liquid, means forming an upright mixing chamber within the tank, open at the top and bottom and having communication with the interior of the tank, means for inducing a downward flow of the liquid from the tank and through the chamber, and means for introducing gas bubbles into the liquid as it flows through the chamber and at the bottom of the chamber whereby said liquid and gas bubbles will flow in opposite directions through the chamber and in commingling relation.

10. An apparatus for treating liquids with gases and embodying a tank for the liquid, means forming an upright mixing chamber within the tank, open at its top and bottom and having communication with the interior of the tank, means for inducing a downward flow of the liquid from the tank and through the chamber, means for introducing gas bubbles into the liquid as it flows through the chamber and at the bottom of the chamber whereby said liquid and gas bubbles will flow in opposite directions through the chamber and in commingling relation, the second recited means embodying a spiral or helicoid fitting within the chamber, and means for rotating the spiral whereby the speed of rotation thereof may be varied to control the flow of liquid and thereby control the velocity of the gas bubbles.

11. An apparatus for treating liquids with gases and embodying a tank for the liquid, means forming an upright mixing chamber within the tank, open at its top and bottom and having communication with the interior of the tank, means for inducing a downward flow of the liquid from the tank and through the chamber, means for introducing gas bubbles into the liquid as it flows through the chamber and at the bottom of the chamber whereby said liquid and gas bubbles will flow in opposite directions through the chamber and in commingling relation, the second recited means embodying a spiral or helicoid fitting within the chamber, means for rotating the spiral, and an agitator operatively connected to rotate with the spiral, the said agitator being arranged at the lower end of said chamber and adjacent the bottom of the tank.

12. An apparatus for treating liquids with gases and embodying a tank for the liquid, a chamber within the tank and open at its top and bottom, said chamber communicating with the interior of the tank, a spiral or helicoid within the chamber for inducing a downward flow of the liquid from the tank and through the chamber, an agitator arranged below and spaced from the spiral to rotate therewith, and a gas supplying device disposed between the agitator and the adjacent end of the spiral, and discharging into the chamber to direct the gas bubbles from the said supplying device upwardly through the liquid and in a direction opposed to the direction of flow of the liquid through the chamber, and means for rotating the spiral or helicoid.

In testimony whereof we have signed our names to this specification on this 28th day of May, A. D. 1919.

WILLIAM SIECK, Jr.
SAMUEL DRUCKER.